(12) United States Patent
Baberg et al.

(10) Patent No.: US 9,216,480 B2
(45) Date of Patent: Dec. 22, 2015

(54) PROCESS FOR PRODUCING A PISTON FOR AN INTERNAL COMBUSTION ENGINE AND PISTON FOR AN INTERNAL COMBUSTION ENGINE

(75) Inventors: Arnd Baberg, Fürth (DE); Frank Thomas Hugo Dörnenburg, Lauf (DE); Klaus Lades, Nürnberg (DE)

(73) Assignee: Federal-Mogul Nurnberg GmbH, Nuremberg (DE)

( * ) Notice: Subject to any disclaimer, the term of this patent is extended or adjusted under 35 U.S.C. 154(b) by 276 days.

(21) Appl. No.: 14/008,652

(22) PCT Filed: Mar. 27, 2012

(86) PCT No.: PCT/EP2012/055403
§ 371 (c)(1),
(2), (4) Date: Nov. 18, 2013

(87) PCT Pub. No.: WO2012/130839
PCT Pub. Date: Oct. 4, 2012

(65) Prior Publication Data
US 2014/0190010 A1 Jul. 10, 2014

(30) Foreign Application Priority Data
Mar. 30, 2011 (DE) .......................... 10 2011 006 409

(51) Int. Cl.
*F02F 3/22* (2006.01)
*B23P 15/10* (2006.01)
*F16J 9/22* (2006.01)
*F02F 3/16* (2006.01)

(52) U.S. Cl.
CPC . *B23P 15/10* (2013.01); *F02F 3/16* (2013.01); *F02F 3/22* (2013.01); *F16J 9/22* (2013.01); *F02F 2200/06* (2013.01); *Y10T 29/49249* (2015.01)

(58) Field of Classification Search
CPC .................. Y10T 29/49249; Y10T 29/49265; Y10T 29/49261; Y10T 29/49263; B23P 15/10; F02F 3/16; F02F 3/22; F02F 3/20; F02F 3/225; F02F 2200/06; F02F 2200/08
See application file for complete search history.

(56) References Cited

U.S. PATENT DOCUMENTS

| | | | | |
|---|---|---|---|---|
| 3,014,771 A | * | 12/1961 | Nichols | ................ B23K 35/266 277/456 |
| 3,181,514 A | | 5/1965 | Druzynski | |
| 4,553,015 A | * | 11/1985 | Ishii | ........................ B23K 15/04 219/121.13 |
| 8,635,982 B2 | * | 1/2014 | Scharp | .................. F02F 3/0092 123/193.1 |

FOREIGN PATENT DOCUMENTS

| | | |
|---|---|---|
| DE | 1001862 B | 1/1957 |
| DE | 1019519 B | 11/1957 |
| DE | 1025221 B | 2/1958 |

(Continued)

*Primary Examiner* — Jason L Vaughan
(74) *Attorney, Agent, or Firm* — Robert L. Stearns; Dickinson Wright, PLLC

(57) ABSTRACT

In a process for producing a piston for an internal combustion engine, a groove is worked into a cast piston blank proceeding from a combustion chamber cavity (20) in a largely radial direction and then closed to form a cooling duct. A cast piston for an internal combustion engine has a closure which is fitted after the casting and the machining between the cooling duct and a combustion chamber cavity (20).

3 Claims, 1 Drawing Sheet

(56) References Cited

FOREIGN PATENT DOCUMENTS

| | | |
|---|---|---|
| DE | 1033954 B | 7/1958 |
| DE | 1583747 C | 9/1970 |
| DE | 2108170 A | 8/1972 |
| DE | 130368 Z | 3/1978 |
| DE | 3518497 A1 | 11/1986 |
| DE | 19915782 A1 | 11/2000 |
| DE | 102006027355 A1 | 12/2007 |
| FR | 1246794 A | 11/1960 |
| FR | 1301299 A | 8/1962 |
| JP | 58190538 A | 11/1983 |
| WO | WO-2005046928 A1 | 5/2005 |

* cited by examiner

PROCESS FOR PRODUCING A PISTON FOR AN INTERNAL COMBUSTION ENGINE AND PISTON FOR AN INTERNAL COMBUSTION ENGINE

BACKGROUND OF THE INVENTION

1. Technical Field

The invention relates to a method for producing a piston for an internal combustion engine and to a piston for an internal combustion engine.

With engine pistons, the areas of the uppermost annular groove and of the combustion chamber cavity are subjected to particular stress. This is often counteracted by a ring carrier or an annular groove reinforcement. At the same time, an annular cooling channel is often provided, which is located in this area.

2. Related Art

It is known to cast ring carriers and/or to provide salt cores that after flushing leave an annular cooling channel including inlets and outlets.

Furthermore, a piston is known, for example, from DE 199 15 782 A1, during the production of which a cooling channel is formed from the piston bottom by rotation with feed in the axial direction of the piston, which is subsequently closed by an aluminum component produced by powder metallurgy.

Similar configurations are known from DD 130 368 Z, DE 103 39 54 B, DE 10 2006 027 355 A1, DE 35 18 497 A, JP 58 190 538 A2, DE 15 83 747 C, U.S. Pat. No. 3,181,514 A, FR 1 301 299 A, DE 10 01 862 B, FR 1 246 794 A, DE 10 25 221 B and DE 10 19 519 B.

SUMMARY OF THE INVENTION

The invention is based on the object of providing a method for producing pistons for internal combustion engines that is improved in terms of efficiency, and a piston produced according thereto.

According thereto, a groove is worked into a cast piston blank, proceeding from a combustion chamber cavity, in a largely radial direction and subsequently closed to form a cooling channel. By this means, the hitherto required salt core for forming the cooling channel can be avoided in an advantageous manner, and the casting process can thus be automated. Furthermore, considerably more extensive machine processing is achieved, and manual processing is reduced, which increases reliability, reduces waste and thus makes the method more efficient as a whole. Moreover, since the cooling channel is located in an area "next to" the combustion chamber cavity, the cooling effect can be improved in the particularly stressed areas. In particular, compared to conventional designs, the cooling channel is arranged at a relatively high level, in particular higher than the uppermost annular groove, and therefore the described advantage can be achieved. Finally, the cooling channel is covered or closed by a material that is separate with respect to the casting material of the piston blank, and this makes it possible to adjust this material in a particular manner with regard to the requirements concerning resistance to heat, and, as will be explained in more detail below, to provide it with properties that are particularly advantageous for this purpose.

These requirements can be fulfilled in a particularly satisfactory manner, and at the same time it is advantageous for simplifying the production process when the cooling channel is closed by a metal sheet. This can be connected with the piston blank, which may be preprocessed in the area in question, by means of a joining process.

Remelting of the metal sheet can occur, advantageously at least in areas, even by the joining process, but just as well after the joining, in order to refine the structure and to thus form a particularly resistant structure in the highly stressed area. The metal sheet is preferably made of aluminum or an aluminum alloy such that the thermo-physical properties of the metal sheet are similar to those of the piston since this is also made of aluminum or an aluminum alloy. Preferably, the two alloys or materials are essentially identical. As regards the remelting of the closure, in particular the metal sheet of the cooling channel, it should be noted that this measure is advantageous even without the radial formation of the cooling channel and must thus be considered to be an independent novelty described herein. It can, however, be combined with all of the measures described herein.

The casting process can be further simplified if a ring carrier as a cast part can also be avoided in an advantageous manner in that a further radial groove is incorporated on the outer side of the piston, filled with material, and an annular groove is formed therein. For example, the groove can be formed so as to be essentially V-shaped, and the material can be incorporated, for example, by thermal spraying. As regards the formation of a radial groove on the outer side as described above, it should also be noted that this can be combined with any design of a cooling channel, in particular also with a cooling channel produced in the axial direction, and also has advantageous effects in this case since cast parts are avoided. A combination with all of the further measures described herein is, however, possible and advantageous.

Moreover, it should be noted that all of the features and measures mentioned exclusively in connection with the method can also be applied to the piston according to the invention, and vice versa.

BRIEF DESCRIPTION OF THE DRAWINGS

An embodiment example of the invention shown in the drawings will be described in more detail below. These show as follows.

DETAILED DESCRIPTION OF A PREFERRED EMBODIMENT OF THE INVENTION

Figure 1:
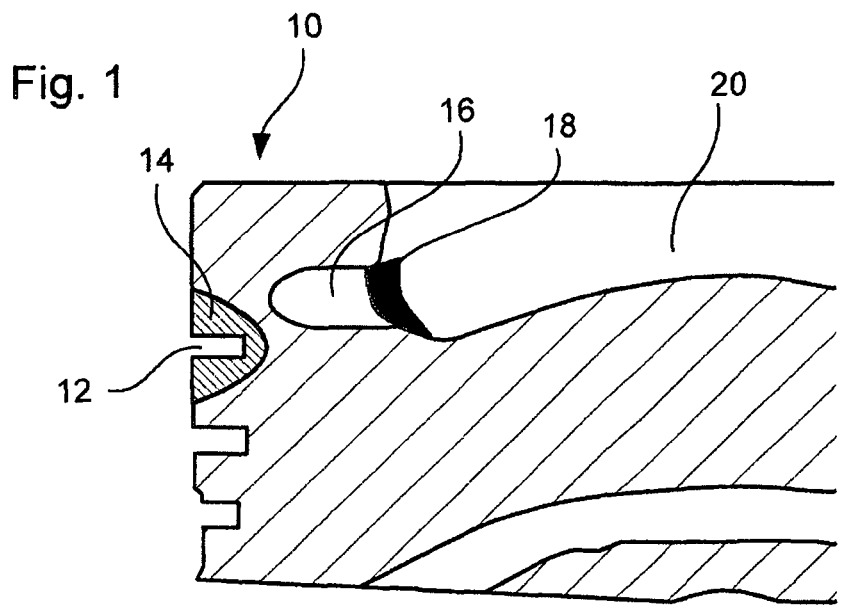
FIG. 1 shows a sectional view of a piston according to the invention at a first stage.

In FIG. 1, somewhat more than half of an upper edge area of a piston according to the invention is shown, which is provided with a plurality of annular grooves, with the uppermost annular groove 12 having been formed in a particular manner and without cast parts necessary for the casting process such as, e.g., ring carriers. In particular, a radial, essentially V-shaped groove was formed on the cast piston blank and filled with a particularly wear-resistant material 14, e.g. by thermal spraying. The groove 12 was worked out of this and is therefore formed in its entirety in a particularly wear-resistant material and withstands the particular stress in this area in an advantageous manner.

This applies analogously to the particular design of a cooling channel 16 and its cover in the form of a metal sheet 18. In FIG. 1, a production stage is shown in which a piston blank that was typically cast and mechanically preprocessed was provided proceeding from the combustion chamber cavity 20 in the radial direction (according to FIG. 1 to the left) with a groove for the later cooling channel 16. As is shown in the figures, the cooling channel can be suitably provided towards the outer side, i.e. towards the annular groove 12 of the piston, with a rounded groove base. In the example shown, this groove is closed by a metal sheet 18 that is attached by means of a suitable joining process. The metal sheet closing the later cooling channel 16 is substantially annular in shape. The V-shape of the material 14 in the area of the uppermost annular groove as well as the groove provided therefor can also have a rounded tip of the "V".

Figure 2:
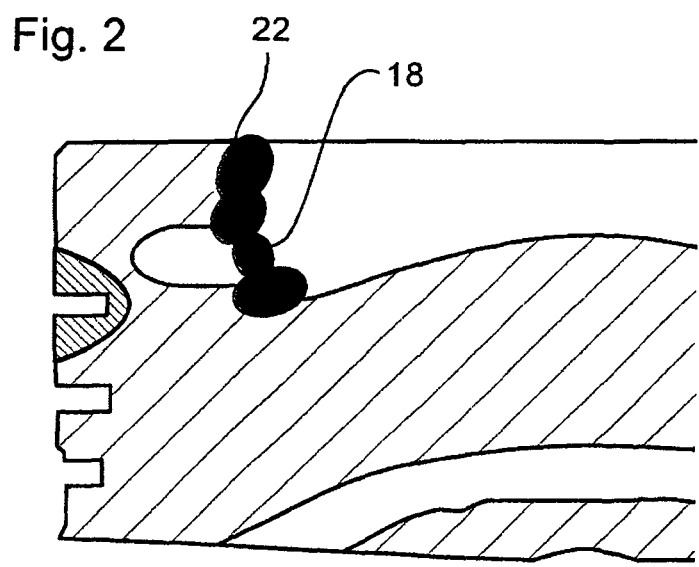
FIG. 2 shows a sectional view of a piston according to the invention at a second stage.

As shown in FIG. 2, the metal sheet 18 can be processed by remelting, at least in areas, in the example shown e.g. at the upper and lower ends, such that the structure is refined. This can also be carried out for adjacent areas 22 on the piston blank, in the example shown on the combustion chamber cavity. As mentioned above, this remelting can take place as part of the joining process of the metal sheet 18 or as a separate, subsequent processing step.

Figure 3:
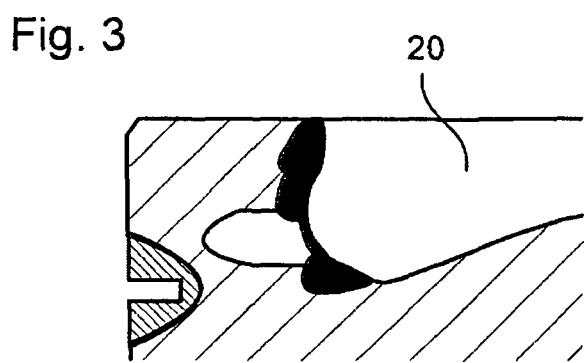
FIG. 3 shows a sectional view of a piston according to the invention at a third stage.

Finally, it is shown in FIG. 3 how, after remelting, essentially the entire lateral boundary of the combustion chamber cavity 20 is finished in a suitable manner and typically by machining in order to form the desired contour. The described processing as well as the casting process during which insertion parts can be omitted in an advantageous manner can be automated to a great extent such that efficiency is increased and the frequency of errors reduced.

The invention claimed is:

1. A method for producing a piston for an internal combustion engine, the method comprising:
    forming a combustion chamber cavity into a cast piston blank;
    after forming the combustion chamber cavity, modifying the combustion chamber cavity by working a groove into a wall of the combustion chamber cavity such that the groove extends radially outward from the combustion chamber cavity; and
    after forming the groove, closing the groove by means of a metal sheet in order to form a cooling groove within the cast piston blank.

2. The method according to claim 1, wherein the closing of the groove includes melting the metal sheet.

3. The method according to claim 1, wherein a radial groove is formed into the cast piston blank, the radial groove extending from an outer side of the cast piston blank, and the steps for forming the radial groove comprising:
    forming a second groove in the cast piston blank,
    after forming the second groove, filling the second groove with a material in order to form a material filled second groove, and
    working the annular groove out of the material filled second groove.

* * * * *